US012718585B2

(12) United States Patent
Raichelgaux

(10) Patent No.: US 12,718,585 B2
(45) Date of Patent: Aug. 25, 2026

(54) ACCURACY FOR OBJECT DETECTION

(71) Applicant: AUTOBRAINS TECHNOLOGIES LTD, Tel Aviv-Jaffa (IL)

(72) Inventor: Igal Raichelgauz, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 371 days.

(21) Appl. No.: 18/468,653

(22) Filed: Sep. 15, 2023

(65) Prior Publication Data

US 2024/0096106 A1 Mar. 21, 2024

Related U.S. Application Data

(63) Continuation-in-part of application No. 18/466,777, filed on Sep. 13, 2023.

(60) Provisional application No. 63/376,057, filed on Sep. 16, 2022.

(51) Int. Cl.

| | |
|---|---|
| ***G06V 20/58*** | (2022.01) |
| ***G01S 7/41*** | (2006.01) |
| ***G01S 13/93*** | (2020.01) |
| ***G06V 10/82*** | (2022.01) |
| ***G06V 10/98*** | (2022.01) |
| ***G08G 1/0967*** | (2006.01) |
| ***H04W 4/40*** | (2018.01) |

(52) U.S. Cl.

CPC .............. *G06V 20/58* (2022.01); *G01S 7/417* (2013.01); *G01S 13/93* (2013.01); *G06V 10/82* (2022.01); *G06V 10/98* (2022.01); *G08G 1/096766* (2013.01); *H04W 4/40* (2018.02)

(58) Field of Classification Search

CPC ......... G01S 13/93; G01S 7/417; G06V 10/82; G06V 10/98; G06V 20/58; G08G 1/096766; G08G 1/166; H04W 4/40

See application file for complete search history.

(56) References Cited

U.S. PATENT DOCUMENTS

| | | | | |
|---|---|---|---|---|
| 2007/0241870 | A1* | 10/2007 | Ohmura | G01S 13/931 340/435 |
| 2007/0250523 | A1* | 10/2007 | Beers | G06T 11/26 |
| 2016/0098606 | A1* | 4/2016 | Nakamura | G06V 20/58 382/103 |
| 2017/0220879 | A1* | 8/2017 | Nakamura | B60R 11/04 |
| 2020/0269877 | A1* | 8/2020 | Mortazavi | G08G 1/0129 |
| 2022/0223059 | A1* | 7/2022 | Kawiecki | G08G 5/34 |
| 2022/0276618 | A1* | 9/2022 | Aroskar | G06N 20/20 |
| 2022/0301235 | A1* | 9/2022 | Sen | G06T 5/94 |
| 2023/0015880 | A1* | 1/2023 | Refaat | G05D 1/0287 |
| 2024/0208536 | A1* | 6/2024 | Pronovost | B60W 30/18159 |
| 2024/0371500 | A1* | 11/2024 | Rubin | G06N 3/096 |
| 2025/0152144 | A1* | 5/2025 | Chen | G16H 50/20 |
| 2025/0310734 | A1* | 10/2025 | Lee | B60W 60/001 |

* cited by examiner

*Primary Examiner* — Michelle M Entezari Hausmann

(74) *Attorney, Agent, or Firm* — RECHES PATENTS

(57) ABSTRACT

A method that is computer implemented and for accuracy for object detection, the method includes (i) receiving content from an information source located outside of a vehicle; (ii) obtaining object information regarding one or more objects located within an environment of the vehicle; and (iii) generating, by applying one or more machine learning models, one or more object related estimations for use in a detection of the one or more objects; wherein at least one of the obtaining and the generating is impacted by the content.

20 Claims, 6 Drawing Sheets

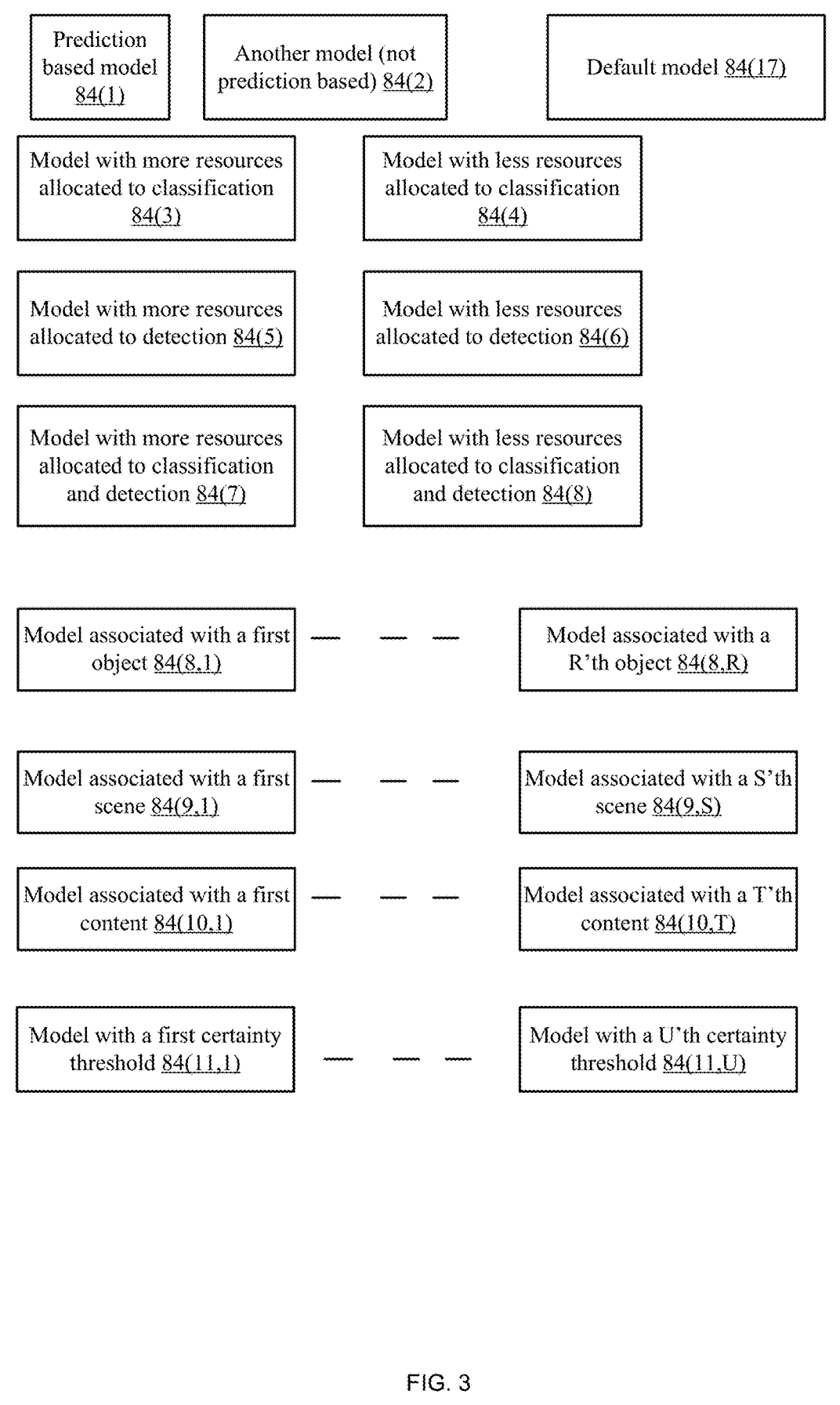

Prediction based model 84(1)

Another model (not prediction based) 84(2)

Default model 84(17)

Model with more resources allocated to classification 84(3)

Model with less resources allocated to classification 84(4)

Model with more resources allocated to detection 84(5)

Model with less resources allocated to detection 84(6)

Model with more resources allocated to classification and detection 84(7)

Model with less resources allocated to classification and detection 84(8)

Model associated with a first object 84(8,1)

Model associated with a R'th object 84(8,R)

Model associated with a first scene 84(9,1)

Model associated with a S'th scene 84(9,S)

Model associated with a first content 84(10,1)

Model associated with a T'th content 84(10,T)

Model with a first certainty threshold 84(11,1)

Model with a U'th certainty threshold 84(11,U)

FIG. 3

ACCURACY FOR OBJECT DETECTION

CROSS REFERENCE

This application claims priority from U.S. provisional patent 63/376,057 filing date Sep. 16, 2022, which is incorporated herein by reference.

This application is a continuation in part of U.S. application Ser. No. 18/466,777, filing date Sep. 13, 2023.

BACKGROUND

Autonomous vehicles (AVs) and vehicles that use autonomous driving assistance system (ADAS) systems make multiple decisions based on their environment. Vehicle sensors sense the environment of the vehicle and a object detection unit searches for one or more objects that are located within the environment.

The object detection is resource consuming and the vehicle computational resources are finite and are also allocated to other tasks.

There is a growing need to provide an efficient method for object detection.

BRIEF DESCRIPTION OF THE DRAWINGS

The embodiments of the disclosure will be understood and appreciated more fully from the following detailed description, taken in conjunction with the drawings in which:

FIG. 3 illustrates examples of models;

SUMMARY

Figure 1:
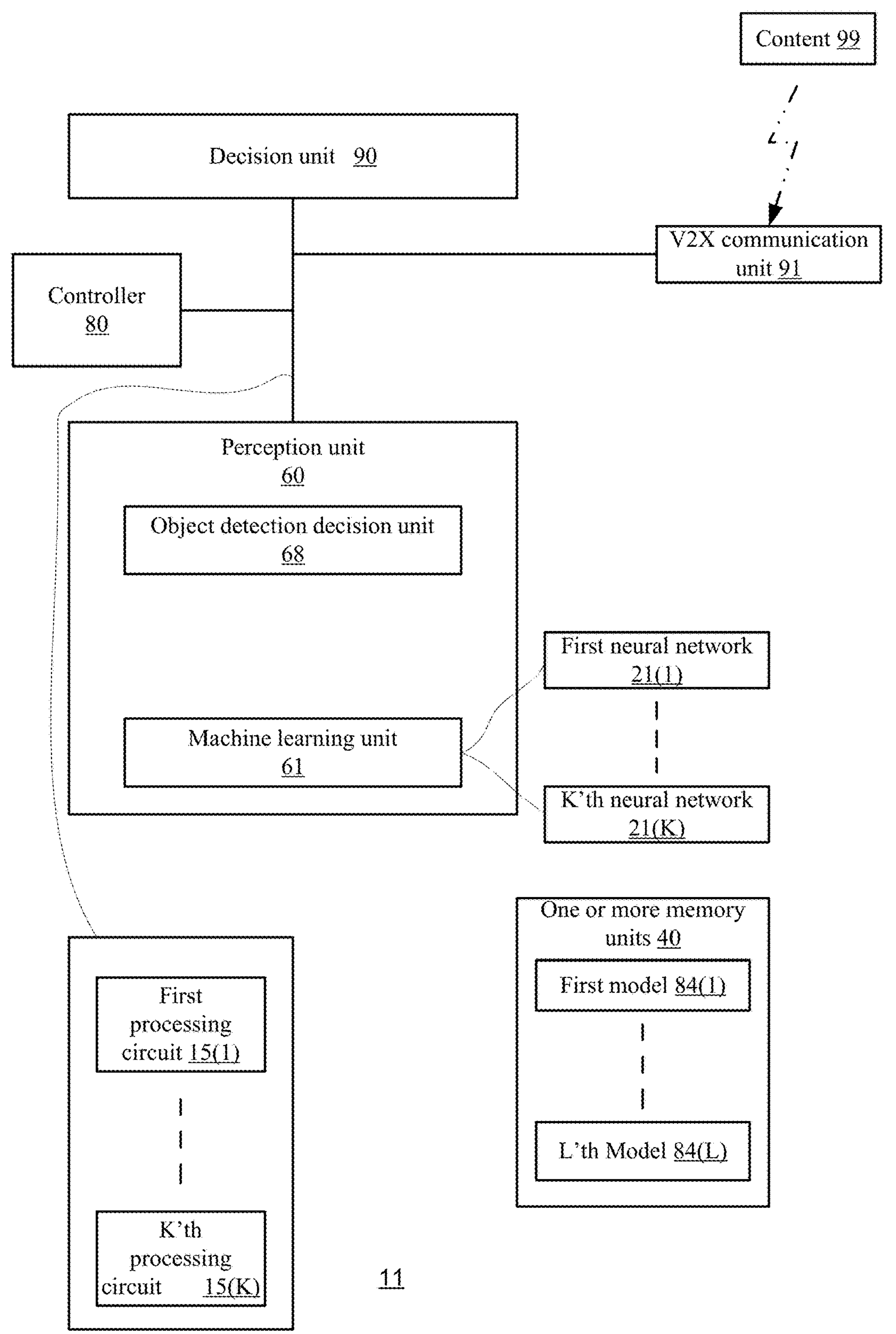
FIGS. 1-2 illustrate examples of a system.

Methods, non-transitory computer readable media and systems for accuracy for object detection.

DESCRIPTION OF EXAMPLE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method. Any reference in the specification to a system or device should be applied mutatis mutandis to a method that may be executed by the system, and/or may be applied mutatis mutandis to non-transitory computer readable medium that stores instructions executable by the system. Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of the units and/or modules that are illustrated in the application, may be implemented in hardware and/or code, instructions and/or commands stored in a non-transitory computer readable medium, may be included in a vehicle, outside a vehicle, in a mobile device, in a server, and the like.

The vehicle may be any type of vehicle—such as a ground transportation vehicle, an airborne vehicle, or a water vessel.

The specification and/or drawings may refer to an image. An image is an example of a media unit. Any reference to an image may be applied mutatis mutandis to a media unit. A media unit may be an example of sensed information unit (SIU). Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to a sensed information unit (SIU). The SIU may be of any kind and may be sensed by any type of sensors—such as a visual light camera, an audio sensor, a sensor that may sense infrared, radar imagery, ultrasound, electro-optics, radiography, LIDAR (light detection and ranging), a thermal sensor, a passive sensor, an active sensor, etc. The sensing may include generating samples (for example, pixel, audio signals) that represent the signal that was transmitted, or otherwise reach the sensor. The SIU may be one or more images, one or more video clips, textual information regarding the one or more images, text describing kinematic information about an object, and the like.

Object information may include any type of information related to an object such as but not limited to a location of the object, a behavior of the object, a velocity of the object, an acceleration of the object, a direction of a propagation of the object, a type of the object, one or more dimensions of the object, and the like. The object information may be a raw SIU, a processed SIU, text information, information derived from the SIU, and the like.

An obtaining of object information may include receiving the object information, generating the object information, participating in a processing of the object information, processing only a part of the object information and/or receiving only another part of the object information. The obtaining of the object information may include object detection or may be executed without performing object detection. A processing of the object information may include at least one out of object detection, noise reduction, improvement of signal to noise ratio, defining bounding boxes, and the like. The object information may be received from one or more sources such as one or more sensors, one or more communication units, one or more memory units, one or more image processors, and the like. The object information may be provided in one or more manners—for example in an absolute manner (for example—providing the coordinates of a location of an object), or in a relative manner—for example in relation to a vehicle (for example the object is located at a certain distance and at a certain angle in relation to the vehicle.

The vehicle is also referred to as an ego-vehicle.

The specification and/or drawings may refer to a processor or to a processing circuitry. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided. Any combination of any subject matter of any of claims may be provided. Any combinations of systems, units, components, processors, sensors, illustrated in the specification and/or drawings may be provided. Any reference to an object may be applicable to a pattern. Accordingly—any reference to object detection is applicable mutatis mutandis to a pattern detection.

According to an embodiment, the object detection benefits from using content received from an information source that is located outside the vehicle.

According to an embodiment, the content may impact one or more steps related to the field related driving in various manners.

According to an embodiment, using the content assists in saving resources—by being able to use simpler models and/or models that require less computational and/or memory resources. Smaller or simpler models require storing less coefficients. Thus—one or more machine learning models used by the method are more cost effective than one or more machine learning models used at an absence of the content.

FIG. 1 illustrates a system 11 that includes perception unit 60, a decision unit 70, a controller 80, a V2X communication unit 91, one or more memory units 40 and processing circuits 15(1)-15(K).

Content 99 is conveyed over a vehicle to everything (V2X) communication channel According to an embodiment, the V2X communication channel may be a vehicle to vehicle communication channel and/or a vehicle to infrastructure communication channel and/or a vehicle to pedestrian communication channel and/or a vehicle to network communication channel.

Figure 2:
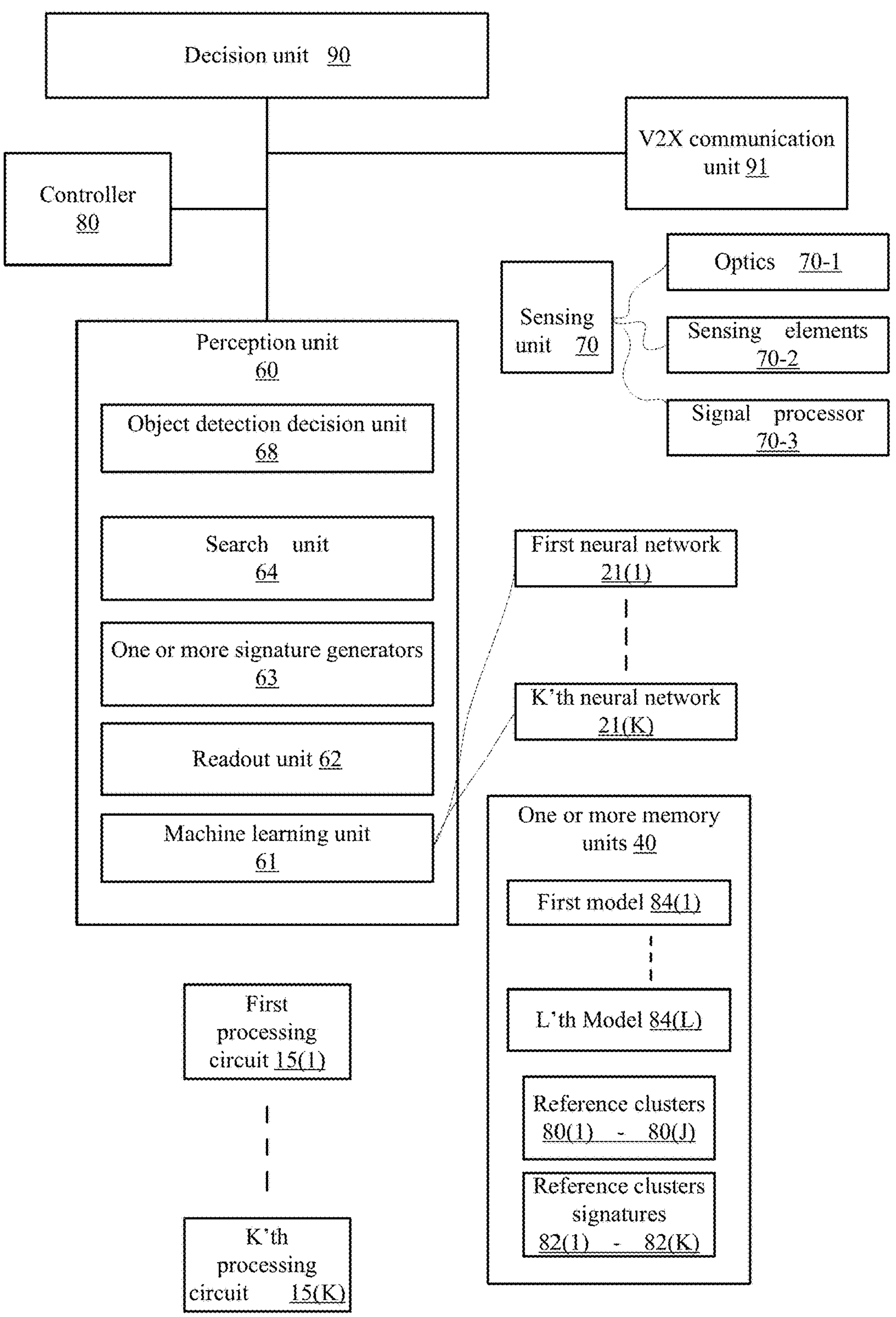

Each unit and/or circuit of FIG. 1 and/or FIG. 2 may be in communication with another unit and/or another circuit.

The content 99 may impact the object detection process in one or more manners.

The processing circuits 15(1)-15(K) are configured to implement the perception unit 60 and/or the decision unit 70 and/or the controller 80. The controller 80 is configured to control the operation of system 11. Accordingly—system 11 may include the processing circuits 15(1)-15(K), the one or more memory units and the V2X communication unit 91.

The perception unit 60 is configured to provide information about the environment—especially provide object information regarding one or more objects located within an environment of the vehicle.

The decision unit 70 is configured to respond to the object information—for example generate a driving related decision, trigger a generation of a driving related decision, control a generation of a driving related decision, and the like.

The perception unit 60 includes a machine learning unit 61 for applying one or more machine learning processed during the object detection process. The machine learning unit 61 may include one or more neural networks and/or may implement one or more modules. FIG. 1 illustrates the machine learning unit 61 as being associated with K neural networks (first neural network till a K'th neural network 21(1)-21(K)) and/or as being associated with L models (having their metadata such as coefficients stored in the one or more memory units 40) the models are denoted first model 84(1)-till L'th model 84(L).

The perception unit also includes an object detection decision unit 68 that is configured to detect the one or more objects within the environment of the vehicle based on (at least) one or more sensed information units (SIU) that are fed to the perception unit (or are generated by the perception unit).

The perception unit 60 may include a sensing unit or may not include a sensing unit. For simplicity of explanation the sensing unit is not shown in FIG. 1—but is shown in FIG. 2.

According to an embodiment, the object detection includes generating, by applying one or more machine learning models (for example by the machine learning unit) to provide one or more object related estimations for use in the detecting of the one or more objects. The one or more object related estimations are used (for example by the object detection decision unit 68) to detect the one or more objects within the environment of the vehicle.

The perception unit 60 and/or the decision unit 70 or one or more units or portions of the perception unit and/or one or more units or portions of the decision unit 70 may be implemented using one or more narrow AI agents. For example—any model and/or NN may be implemented by a narrow AI agent. An AI agent is narrow in the sense this may be adapted to manage only a small part (for example less than 1, 2, 3, 4, 5 percent) of the overall objects and/or scenes and/or scenarios) managed by system 11.

According to an embodiment, the one or more machine learning models are included in one or more narrow AI agents.

FIG. 2 illustrates a system 12 for signature based object detection—and shows perception unit 60, decision unit 90, controller 80, V2X communication unit 91, one or more memory units 40, processing circuits 15(1)-15(K) and sensing unit 70.

FIG. 2 differs from FIG. 1 by (a) including the sensing unit 70, (b) illustrating the perception unit as further including readout unit 61, one or more signature generators 63, and a search unit 64, and (c) having the one or more memory units store reference clusters 80(1)-80(J) and store reference cluster signatures 82(1)-82(K). It should be noted that the perception unit may include only one or two of the readout unit 61, the one or more signature generators 63, and the search unit 64.

According to an embodiment the object detection process includes (i) applying one or more machine learning models (for example by the machine learning unit) to provide one or more object related estimations, (ii) reading the one or more object related estimations by the readout unit 62, (ii) generating one or more signatures by one or more signature generators 63 based on redout information provided by readout unit 64, and (iii) detect one or more matching cluster by comparing the cluster signatures to the one or more signatures generated by the one or more signature generator, (iv) detecting the one or more objects (by the object detection decision unit 68) based on context associated with one or more matching clusters. For example—if a signature generated by a signature generator matches a cluster signature of a cluster that identifies a pedestrian—then the outcome of the object detection may be that a pedestrian is located within the environment of the vehicle. The location of the pedestrian is also determined.

FIG. 3 illustrates examples of various models out of the models illustrated in FIGS. 1 and 2.

The modules include a prediction based model 84(1), another model (not a prediction based) 84(2), model with more resources accolated to classification 84(3), model with less resources accolated to classification 84(4), model with more resources accolated to detection 84(5), model with less resources accolated to detection 84(6), model with more resources accolated to classification and detection 84(7), model with less resources accolated to classification and detection 84(8). The terms "less" and "more" refer to a relationship between one model of models 84(1)-84(8) to a default model 84(17)—or to another model of models 84(1)-84(8).

The models also include R models that are associated with R different objects 84(8,1)-84(8,R), S models that are associated with S different scenes 84(9,1)-84(10,S), T models that are associated with T different objects 84(10,1)-84(10, T), and U models that are associated with U different scenes 84(11,1)-84(11,U).

All these entities may be selected based on the content and/or adjusted and/or tunes based on the content.

Figure 4:
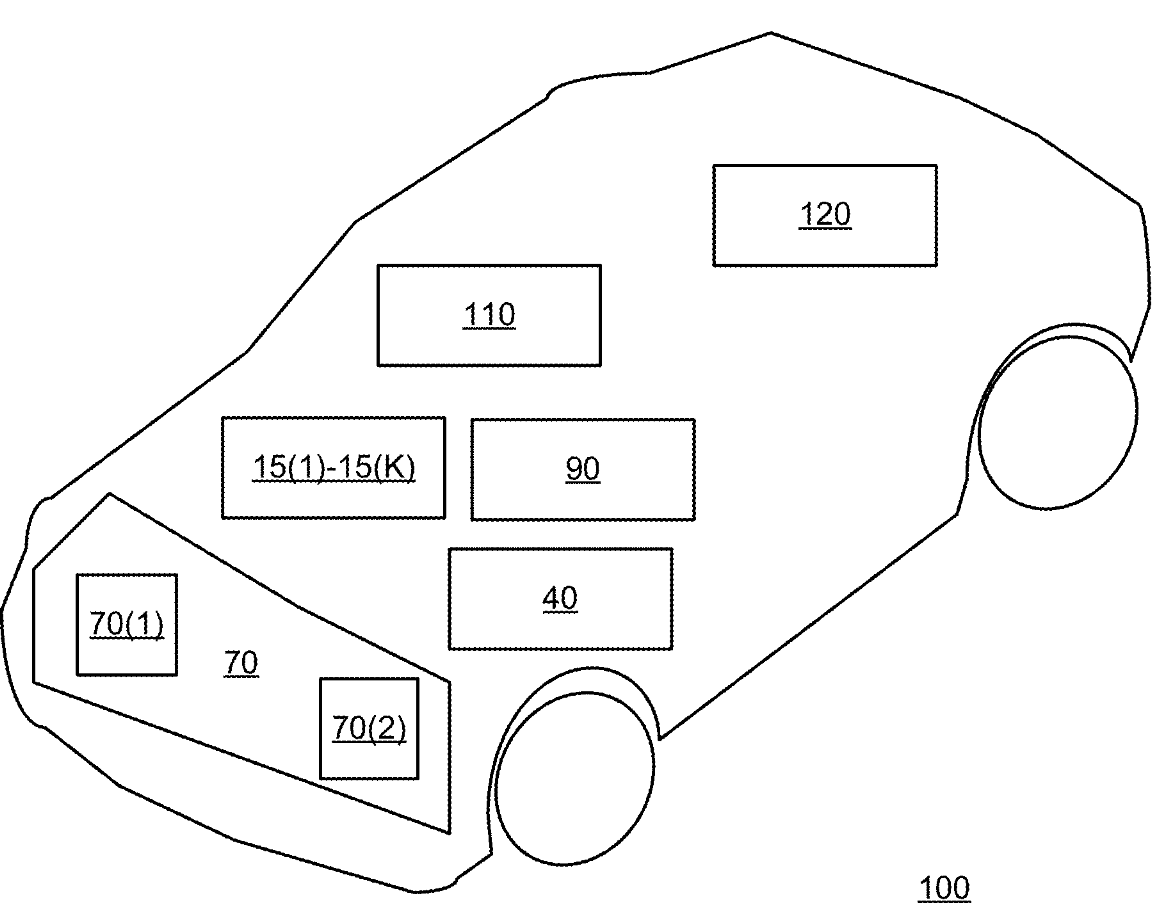
FIG. 4 illustrates an example of a vehicle.

FIG. 4 illustrates examples of vehicle 100. Vehicle 100 includes a vehicle sending unit 70 that may include one or more sensors such as vehicle sensors 70(1) and 70(2). Vehicle 100 also includes one or more processing circuits processing circuits 15(1)-15(K), one or more memory units 40, a communication unit 90 that includes the V2X communication unit 91 (and may also include a non-V2X communication unit), one or more vehicle units (collectively denoted 110) that may include one or more vehicle computers, and/or units controlled by the one or more vehicle units, and/or motor units, and/or chassis, and/or wheels, and the like. The processing circuits 15(1)-15(K)(also referred to as processing circuitry) are configured to execute any of the methods illustrated in this application.

Figure 5:
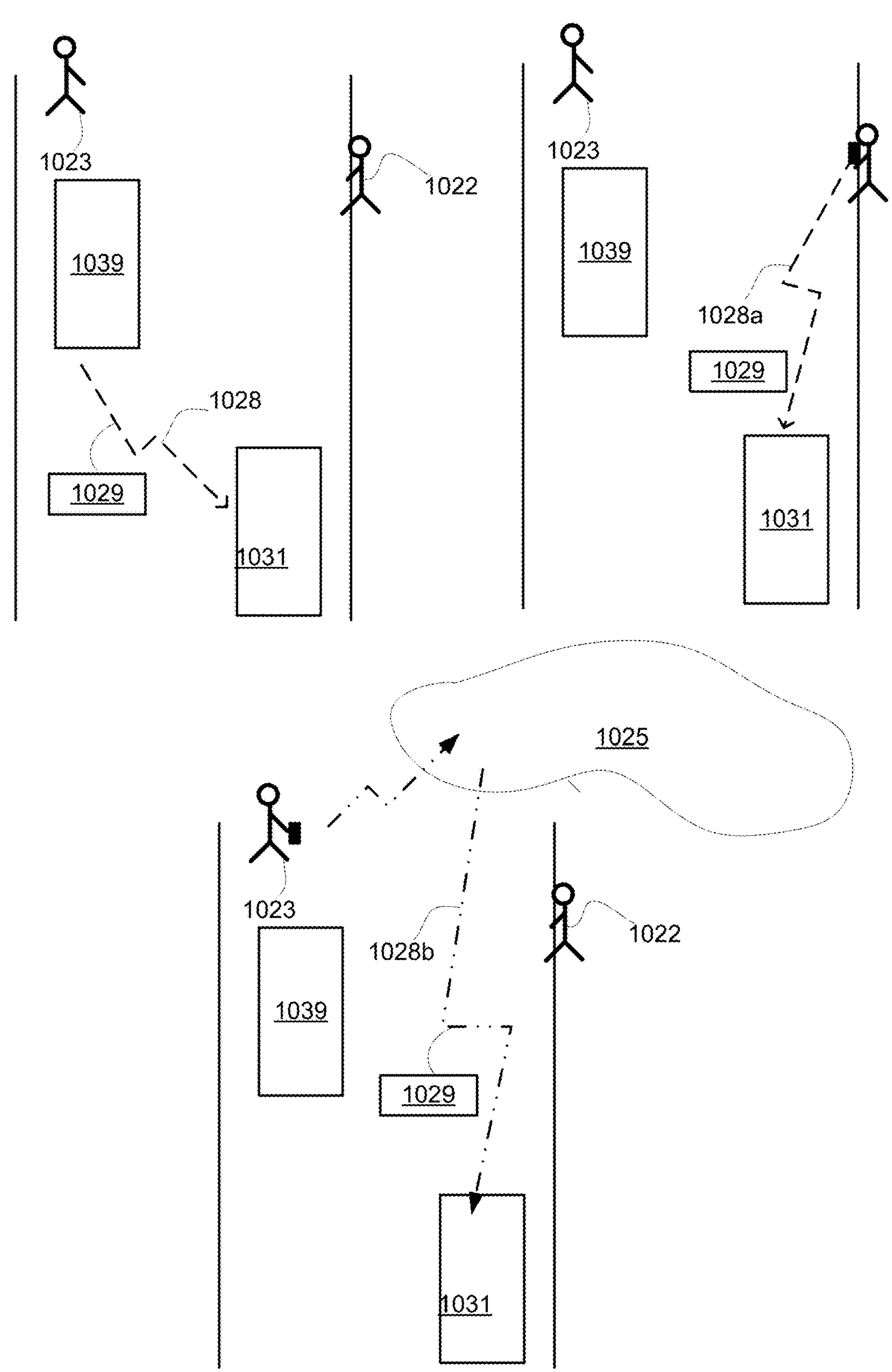
FIG. 5 illustrates examples of scenarios.

FIG. 5 illustrates an example of a vehicle 1031, another vehicle 1039 that drives at an opposite direction of vehicle 1031, pedestrian 1022, other pedestrian 1023, and content 1029.

The another pedestrian 1023 is concealed from vehicle 1031 by other vehicle 1039.

FIG. 5 also illustrates three scenarios:

a. A first scenario in which the V2X communication channel is a vehicle to vehicle (V2V) communication channel 1028 and the content 1029 (indicative of the other pedestrian 1023) is sent to vehicle 1031 from the other vehicle 1039.
b. A second scenario in which the V2X communication channel is a vehicle to pedestrian device (V2PD) communication channel 1028*a* and the content 1029 (indicative of the other pedestrian 1023) is sent to vehicle 1031 from a device of the pedestrian.
c. A third scenario in which the V2X communication channel is another vehicle to pedestrian device (V2PD) communication channel 1028*b* and the content 1029 (indicative of the other pedestrian 1023) is sent to vehicle 1031 from a network 1025 that is in communication with a device of the other pedestrian.

Figure 6:
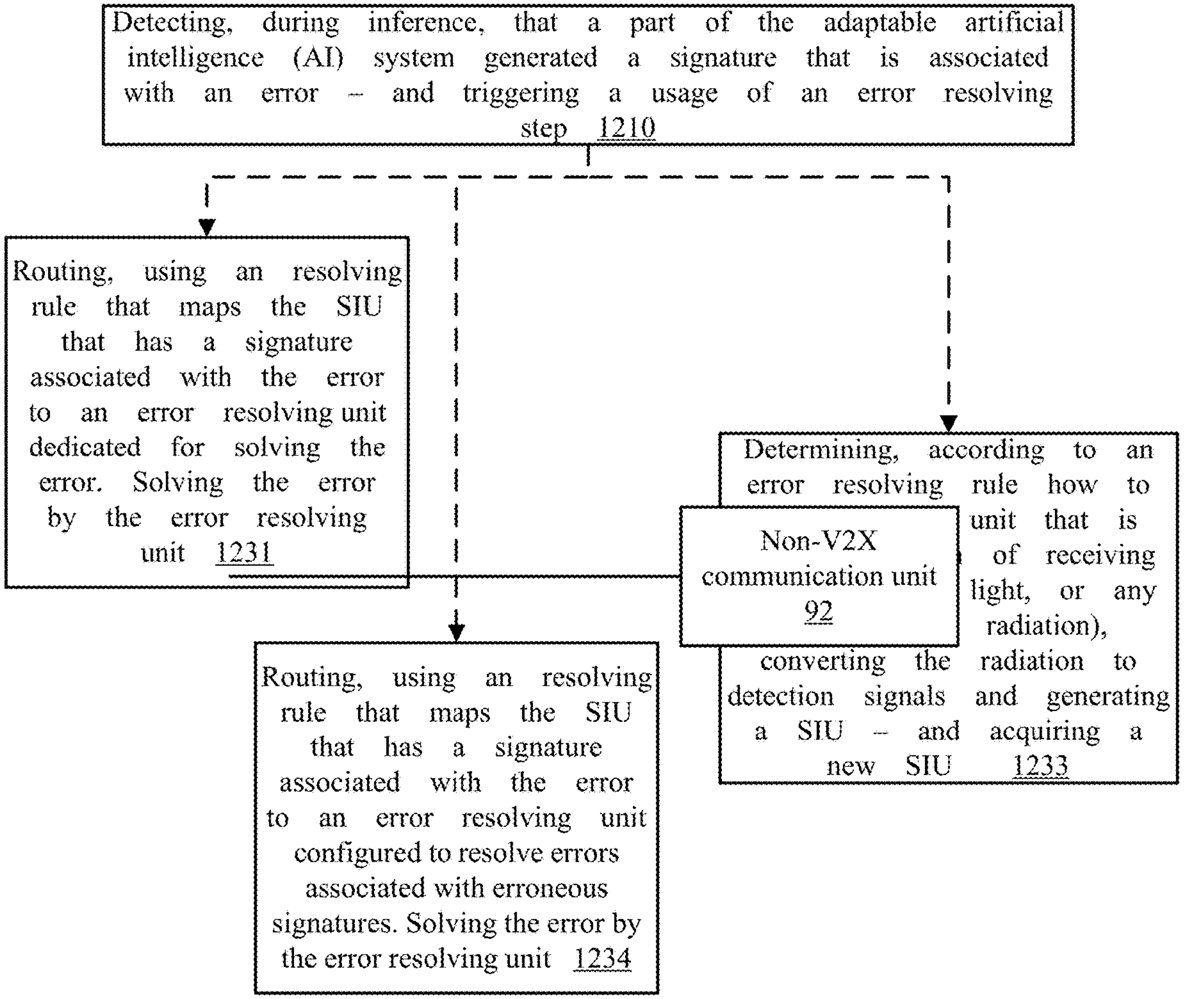
FIG. 6 illustrates an example of a method.

FIG. 6 illustrates an example of method 300 for accuracy for object detection.

Method 300 may be executed by the units and/or circuits illustrated in FIG. 1 and/or in FIG. 2.

According to an embodiment, method 300 includes step 310 of receiving content from an information source located outside of a vehicle.

According to an embodiment, the content is indicative of an object. The object may be a road user, a pedestrian or any other object. The content may provide location information related to the location of the object. The content may include contextual information such as a situation to be faced by the vehicle. The content may be indicative of an object that is not yet sensed by the vehicle (also referred to as a hidden object or a non-sensed object).

According to an embodiment, step 310 is followed by step 320 of obtaining object information regarding one or more objects located within an environment of the vehicle.

According to an embodiment, step 320 is followed by step 330 of generating, by applying one or more machine learning models, one or more object related estimations for use in a detection of the one or more objects.

According to an embodiment, the estimations are features that are generated by one or more neural networks.

As indicated by the dashed lines of FIG. 6—at least one of the obtaining and the generating is impacted by the content.

According to an embodiment, step 330 is followed by step 340 of detecting the one or more objects based on the one or more object related estimations.

According to an embodiment, the estimations are read by a readout unit and are fed to one or more signature generators.

According to an embodiment, step 340 is followed by step 350 of responding to the detecting of the one or more objects.

Non-limiting example of responding include:

a. Triggering a determining of a driving related operation based on the detecting of the one or more objects.
b. Triggering a performing of a driving related operation based on the detecting of the one or more objects.
c. Requesting or instructing an execution of a driving related operation.
d. Triggering a calculation of a driving related operation, based on the detecting of the one or more objects.
e. Sending information about the one or more objects to a control unit of the vehicle.
f. Taking control over the vehicle—transferring the control from the driver to an autonomous driving unit.

According to an embodiment, at least one step of steps 330, 340 and 350 is impacted by the content.

According to an embodiment, at least one step of steps 330, 340 and 350 is selectively executed based on the content. Selectively executed may mean that a value of one or more parameter related to the execution of the step is determined based on the content—for example selecting a model to apply out of multiple models, changing one or more SIU acquisition parameter, determine how many resources to allocate to classification and/or detection. An allocation of resources and/or selection of module may include, for example, determining the size of a model and/or determining a number of feature vectors per feature map, determining a connectivity between nodes of a neural network (more connectivity may mean more resources), and the like.

According to an embodiment, executing a model involves retrieving coefficients that represent nodes from the memory and multiplying the coefficients by content that is inputted to the nodes and performing node based summing Allocation less resources may involve less memory and/or fewer multiplications and/or node based additions.

According to an embodiment the content may facilitate a prediction of an object that is currently hidden and may provide a longer response period to the presence of the object—for example longer time to apply an emergency breaking, longer time to determine the progress of the vehicle (related to the virtual forces applied on the vehicle). This may enable to use lesser resources by avoiding urgent last moment rush or peak processing required when an object located in proximity to the vehicle is suddenly detected.

According to an embodiment, step 320 of obtaining object information regarding one or more objects located within an environment of the vehicle is impacted by the content. The object information may include the content or may not include the content. The object information may be generated by one or more sensors of the vehicle.

According to an embodiment, step 320 is in accordance with the content.

According to an embodiment, step 320 includes receiving at least a part of the object information from the information source.

According to an embodiment, the impact on step 320 includes determining the manner in which the object information is acquired and/or processed.

According to an embodiment, the impact on step 320 includes at least one of (a) determining the manner in which the object information is acquired and/or processed, (b) acquiring and/or processing the object information according to the manner in which the object information is acquired and/or processed, (c) triggering acquiring and/or processing the object information according to the manner in which the object information is acquired and/or processed.

According to an embodiment, there may be provided a sensing unit that includes at least one sensor and/or at least one or more processing circuits for processing detection signals from the one or more sensor. Any parameter of the sensing unit is modifiable according to the content.

According to an embodiment, the manner in which the object information is acquired and/or processed, includes at least one of:

a. The field of view (FOV) of one or more sensor.
i. Concentrating on the region in which the object should be located.
ii. Increasing the FOV.
iii. Reducing the FOV.
iv. Setting the shape of the FOV.
b. The focus of the sensor.
c. The frequency of acquisition of SIUs.
d. A magnification of the sensor.
e. An exposure time of the sensor.
f. A polarization of the sensor.
g. A sensitivity of the sensor.
h. A frequency of reading the sensor.
i. A frequency or generating the detection sensor.
j. Any parameter related to optics that preceded the sensor.
k. Any parameter related to processing the detection signals generated from the sensor.
i. Noise reduction processing.
ii. Filtering.
iii. Determination of a bounding shape related to one or more objects.

According to an embodiment, an object detection processing phase that includes step 330 and/or step 340 is impacted by the content.

According to an embodiment, the manner in which object detection processing phase is impacted includes at least one of:

a. Applying a prediction based model (the prediction is the content) instead of another model that is not based on the prediction (which is the content). The prediction based model is configured to determine the one or more virtual fields based on the assumption that there is an object (identified by the content)—even when the object is not currently sensed by the vehicle.
b. Applying a model that allocates less resources to classification—as the content provides a cue about the object to be sensed (or which is already sensed) by the vehicle.
c. Applying a model that allocates less resources (e.g. less compute resources and/or storage resources) to classification and to detection—when the content provides a cue about the object (and a location of the object) to be sensed (or which is already sensed) by the vehicle.
d. When the content can be used to determine a region of an SIU in which the object will appear—applying a model that allocates more, or more dedicated resources for the processing of that region, in comparison to one or more other regions.
e. Performing an object detection with a lower certainty threshold (or a lower confidence level threshold)—as the cue already provides an indication about an object to be sensed (or which is already sensed) by the vehicle.
f. Taking into account an object that appears within the SIU at a certain size—even if the objects should be ignored (based on size considerations—for example not processing objects that appear in the SIU below a certain size threshold) at an absence of the content.

According to an embodiment, the object detection processing phase and/or step 720 are contingent on the determined spatial relationships between the information source, the specified object and the vehicle. Method 300 may include obtaining location information pertaining to a location of the information source, and determining the spatial relationships between the information source, the specified object and the vehicle, such that the virtual force is determined in an accurate manner The information source has a different view point of the specified object—than the view point of the vehicle (even when the vehicle senses the specified object). Accordingly, the information source and the vehicle may use coordinate systems—which are not aligned to each other—and in order to determine the location of the object in the coordinate system of the vehicle—there is a need to determine the spatial relationships between the information source, the specified object and the vehicle.

According to an embodiment, the specified object may appear in one part (or region) of an SIU captured by the information source and may appear in another part (or region) of an SIU captured by the vehicle. Method 300 may include determining the location of the specified object within one or more SIU (may be currently acquired SIUs or SIUs to be acquired in the future) in order to process the SIUs properly—for example in order to process the part (or region) of the SIU in which the object appears—in a manner that impacted by the presence of the object in that part (or region).

For example, with the content identified from the information source pertains primarily to a child that is currently hidden. The method may include allocating resources for sensing the child (for example at a certain SIU part) by the vehicle and once sensed—to calculate at least a virtual field representing the impact of the child on the vehicle.

According to an embodiment, method 300 includes selecting the NN out of a group of NNs based on the content. The selected NN may be better trained or be better fit to detect the object indicated by the content. For example—if the content is indicative of a pedestrian than a NN trained to detect a pedestrian may be selected—and not an NN trained to detect a vehicle. The same applicable to a selection of a model.

According to an embodiment, the selection is made based on the content and on a size in which an object identified by the content appears in the SIU.

According to an embodiment, step 350 of responding to the detecting of the one or more objects is impacted by the content. The responding may take into account the presence of an object identified by the object even before the object is sensed by the vehicle. For example—the vehicle may generate an audio alert when reaching near an object that is currently concealed. For example—assuming that the content is indicative of a presence of a pedestrian that is located behind a school bus—then the vehicle may generate an audio alert indicative of the presence of the vehicle when approaching the bus.

Yet for another example—the responding may include a visualization of the currently hidden object and/or of a virtual field related to the hidden object.

According to an embodiment, the content may be associated with different trust levels. For example—the content may be associated with a lower trust level that will require an object associated with the content to be sensed by the vehicle—before the vehicle will determine a virtual field associated with the object. Yet for another example—the content may be associated with a higher level of trust that will allow the vehicle to detect the object at a lower confidence level and/or when allocating lower resources to the detection of the object. Yet for a further example—a virtual force may be calculated in association with the object—even before the object is sensed.

According to an embodiment, method 300 (for example step 350) includes communicating, over the V2X channel, information about the one or more objects.

According to an embodiment, the content is related to a specified object that is located at a region within the environment, and the impacting is related to the region. Thus—SIU part related to the region may be processed differently than other parts of the SIU—for example a lower confidence threshold may be used to detect the object, the SIU part related to the region may be processed more frequently than other parts, the FOV of a sensor may be set to acquire the region, and the like.

According to an embodiment, any model may be adapted to execute the entire object detection process, only perception unit related operations (any operation executed by the perception unit—for example signature generation, generating estimations related to the one or more objects), only decision unit related operations (any operation executed by the decision unit—including the responding to the detection of the one or more objects)—or any combination of steps of method 300.

In the foregoing specification, the invention has been described with reference to specific examples of embodiments of the invention. It will, however, be evident that various modifications and changes may be made therein without departing from the broader spirit and scope of the invention as set forth in the appended claims. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality. Furthermore, those skilled in the art will recognize that boundaries between the above described operations are merely illustrative. The multiple operations may be combined into a single operation, a single operation may be distributed in additional operations and operations may be executed at least partially overlapping in time.

Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps then those listed in a claim.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage. While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination. It will be appreciated by people skilled in the art that the embodiments of the disclosure are not limited by what has been particularly shown and described hereinabove. Rather the scope of the embodiments of the disclosure is defined by the appended claims and equivalents thereof.

In relation reference to any model and/or neural network the term "less" may be less than 5%, 10%, 15%, 20%, 25%, 30%, 35%, 40%, 45%, 50%, 55%, 60%, 65%, 70%, 80%, 85%, 90%, 95% or 99%. In relation reference to any model and/or neural network the term "more" may be more than 5%, 10%, 15%, 20%, 25%, 30%, 35%, 40%, 45%, 50%, 55%, 60%, 65%, 70%, 80%, 85%, 90%, 95% or 99%. For example, a model with less resources may be a model with less than 5%, 10%, 15%, 20%, 25%, 30%, 35%, 40%, 45%, 50%, 55%, 60%, 65%, 70%, 80%, 85%, 90%, 95% or 99% that the resources of another model.

What is claimed is:

1. A method that is computer implemented and for accuracy for object detection, the method comprises: receiving, by a computerized system of a vehicle, over a vehicle to everything (V2X) communication channel, and during a driving session of the vehicle, content from an information source located outside of a vehicle; wherein the content provides one or more cues regarding a location and a type of one or more objects located within an environment of the vehicle; obtaining object information regarding the one or more objects; selecting, out of multiple machine learning models and based on the content, one or more selected machine learning models to provide one or more object related estimations; wherein the one or more selected machine learning models have fewer coefficients than one or more corresponding non-selected machine learning models of the multiple machine learning models configured to provide the one or more object related estimations at an absence of the one or more cues; and generating, by applying the one or more selected machine learning models, the one or more object related estimations for use in a detection of the one or more objects; detecting the one or more objects based on the one or more object related estimations; and responding to the detecting by autonomously driving the vehicle.

2. The method according to claim 1, wherein the one or more selected machine learning models are implemented by one or more neural networks that have less connectivity between nodes than one or more other neural networks implementing the one or more corresponding non-selected machine learning models.

3. The method according to claim 1, wherein the one or more machine learning models are included in one or more narrow AI agents.

4. The method according to claim 1, further comprising determining, based on the content and for each object of the one or more objects, a region of a sensed information unit in which the object is expected to appear, and for each object allocating by a machine learning process associated with the object, more resources for processing of the region or interest and allocating fewer resources to process one or more other regions of the sensed information unit.

5. The method according to claim 1, wherein at a first point in time the vehicle to everything channel is a pedestrian device to vehicle communication channel.

6. The method according to claim 5, wherein at a second point in time the vehicle to everything communication channel is a vehicle to vehicle communication channel.

7. The method according to claim 1, wherein the one or more machine learning models are implemented by one or more neural networks that have less feature vectors per feature map than one or more other neural networks implementing the one or more corresponding non-selected machine learning models.

8. The method according to claim 1, wherein the obtaining of the object information is in accordance with the content.

9. The method according to claim 1, further comprising predicting an object that is currently hidden from the vehicle.

10. The method according to claim 1, wherein the obtaining object information comprises generating, by a sensing unit, one or more sensed information units, in accordance with the content.

11. The method according to claim 1, wherein the obtaining of the information comprises receiving at least a part of the object information from the information source.

12. The method according to claim 1, wherein the one or more estimations are features that are generated by one or more neural networks, are read by a readout unit and are fed to one or more signature generators.

13. A non-transitory computer readable medium storing instructions that, when executed by at least one processor, cause the at least one processor to perform operations for accuracy for object detection, comprising: receiving, by a computerized system of a vehicle, over a vehicle to everything (V2X) communication channel, and during a driving session of the vehicle, content from an information source located outside of a vehicle; wherein the content provides one or more cues regarding a location and a type of one or more objects located within an environment of the vehicle; obtaining object information regarding the one or more objects; selecting, out of multiple machine learning models and based on the content, one or more selected machine learning models to provide one or more object related estimations; wherein the one or more selected machine learning models have fewer coefficients than one or more corresponding non-selected machine learning models of the multiple machine learning models configured to provide the one or more object related estimations at an absence of the one or more cues; and generating, by applying one or more selected machine learning models, the one or more object related estimations for use in a detection of the one or more objects; detecting the one or more objects based on the one or more object related estimations; and responding to the detecting by autonomously driving the vehicle.

14. The non-transitory computer readable medium according to claim 13, wherein the one or more selected machine learning models are implemented by one or more neural networks that have less connectivity between nodes than one or more other neural networks implementing the one or more corresponding non-selected machine learning models.

15. The non-transitory computer readable medium according to claim 13, wherein the one or more machine learning models are included in one or more narrow AI agents.

16. The non-transitory computer readable medium according to claim 13, further storing instructions for determining, based on the content and for each object of the one or more objects, a region of a sensed information unit in which the object is expected to appear, and for each object allocating by a machine learning process associated with the object, more resources for processing of the region or interest and allocating fewer resources to process one or more other regions of the sensed information unit.

17. The non-transitory computer readable medium according to claim 13, wherein at a first point in time the vehicle to everything channel is a pedestrian device to vehicle communication channel.

18. The non-transitory computer readable medium according to claim 13, wherein the obtaining object information comprises generating, by a sensing unit, one or more sensed information units, in accordance with the content.

19. The non-transitory computer readable medium according to claim 13, wherein the obtaining of the information comprises receiving at least a part of the object information from the information source.

20. The non-transitory computer readable medium according to claim 13, wherein the one or more estimations are features that are generated by one or more neural networks, are read by a readout unit and are fed to one or more signature generators.

* * * * *